United States Patent
Koenekamp et al.

(10) Patent No.: US 9,160,040 B2
(45) Date of Patent: Oct. 13, 2015

(54) CELL DELTA-TEMPERATURE OPTIMIZED BATTERY MODULE CONFIGURATION

(71) Applicant: GM GLOBAL TECHNOLOGY OPERATIONS LLC, Detroit, MI (US)

(72) Inventors: Andreas Koenekamp, Darmstadt (DE); Alexander Dudek, Darmstadt (DE); Boris Schilder, Frankfurt am Main (DE)

(73) Assignee: GM Global Technology Operations, LLC, Detroit, MI (US)

( * ) Notice: Subject to any disclaimer, the term of this patent is extended or adjusted under 35 U.S.C. 154(b) by 115 days.

(21) Appl. No.: 13/948,455

(22) Filed: Jul. 23, 2013

(65) Prior Publication Data
US 2015/0030900 A1  Jan. 29, 2015

(51) Int. Cl.
*H01M 10/613* (2014.01)

(52) U.S. Cl.
CPC ........ *H01M 10/5004* (2013.01); *H01M 10/613* (2015.04)

(58) Field of Classification Search
CPC ............... H01M 10/5004; H01M 10/5008; H01M 10/5016; H01M 10/613
See application file for complete search history.

(56) References Cited

U.S. PATENT DOCUMENTS

| | | | |
|---|---|---|---|
| 2006/0078790 A1* | 4/2006 | Nimon et al. | 429/137 |
| 2012/0040223 A1* | 2/2012 | Odumodu | 429/120 |

\* cited by examiner

*Primary Examiner* — Brittany Raymond
(74) *Attorney, Agent, or Firm* — Brooks Kushman P.C.

(57) ABSTRACT

A battery module includes a plurality of battery cells. Each battery cell includes an anode having an anode active area, a cathode having a cathode active area, and an ion-conducting separator interposed between the anode active area and the cathode active area. A first subset of the battery cells are arranged in parallel wired battery cell pairs. Each parallel wired battery cell pair of the first subset has two adjacent battery cells with a cooling fin interposed between the two adjacent battery cells.

17 Claims, 5 Drawing Sheets

CELL DELTA-TEMPERATURE OPTIMIZED BATTERY MODULE CONFIGURATION

FIELD OF THE INVENTION

In at least one aspect, the present invention relates to battery module assemblies with improved thermal properties.

BACKGROUND

Large capacity rechargeable batteries are currently being investigated for use in electric vehicles. The ultimate feasibility of electric vehicles depends on significantly reducing the associated costs. Reduction in the costs of battery assemblies is particularly important.

Lithium ion batteries are an important type of battery technology. Most battery assemblies, including lithium ion battery assemblies, include a plurality of individual electrochemical cells. Typically, such electrochemical cells include an anode, a cathode, and a separator interposed between the anode and cathode. Typically, the anode includes a metal sheet or foil (usually copper metal) over-coated with a graphitic layer. Similarly, the cathode usually includes a metal sheet or foil (usually aluminum metal) over-coated with a lithium-containing layer. Finally, electrochemical cells include an electrolyte which is interposed between the anode and the cathode. Terminals allow the generated electricity to be used in an external circuit. Electrochemical cells produce electricity via an electrochemical reaction.

For high power and high energy applications, a plurality of battery cells are utilized and assembled into a battery module. Moreover, such battery modules include a plurality of metallic (e.g., copper and/or aluminum) cooling fins interspersed between battery cells in a parallel wired battery cell pair. Compression foam pads are typically interspersed between some battery cell pairs. With a high number of cooling fins, small temperature differences can be achieved. However, in order to reduce the cost of the battery, a low number of fins is desired.

Accordingly, there is a need for improved battery module assemblies and for methods of constructing such battery module assemblies.

SUMMARY OF THE INVENTION

The present invention solves one or more problems of the prior art by providing a battery module with improved temperature performance. The battery module includes a plurality of battery cells. Each battery cell includes an anode having an anode active area, a cathode having a cathode active area, and an ion-conducting separator interposed between the anode active area and the cathode active area. A first subset of the battery cells is arranged in parallel wired battery cell pairs. Each parallel wired battery cell pair of the first subset has two adjacent battery cells with a cooling fin interposed between the two adjacent battery cells. Advantageously, the present embodiment minimizes temperature differences between parallel connected cells thereby reducing inhomogeneous current distribution between parallel cells. The reduction of such temperature differences results in increased battery lifetime.

In another embodiment, a battery module comprising a first subset of battery cell pairs and a second subset of battery cell pairs is provided. Each battery cell pair of the first subset includes adjacent battery cells with a cooling fin interposed between the adjacent battery cells. Each battery cell pair of the second subset includes adjacent battery cells that are different than the adjacent battery cells of the first subset with a structural layer interposed between the adjacent battery cells of the second subset. In this embodiment, battery cell pairs are stacked in an alternating configuration with each battery cell pair of the second subset being positioned between battery cell pairs of the first subset.

BRIEF DESCRIPTION OF THE DRAWINGS

Exemplary embodiments of the present invention will become more fully understood from the detailed description and the accompanying drawings, wherein.

DESCRIPTION OF THE INVENTION

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Figure 1:
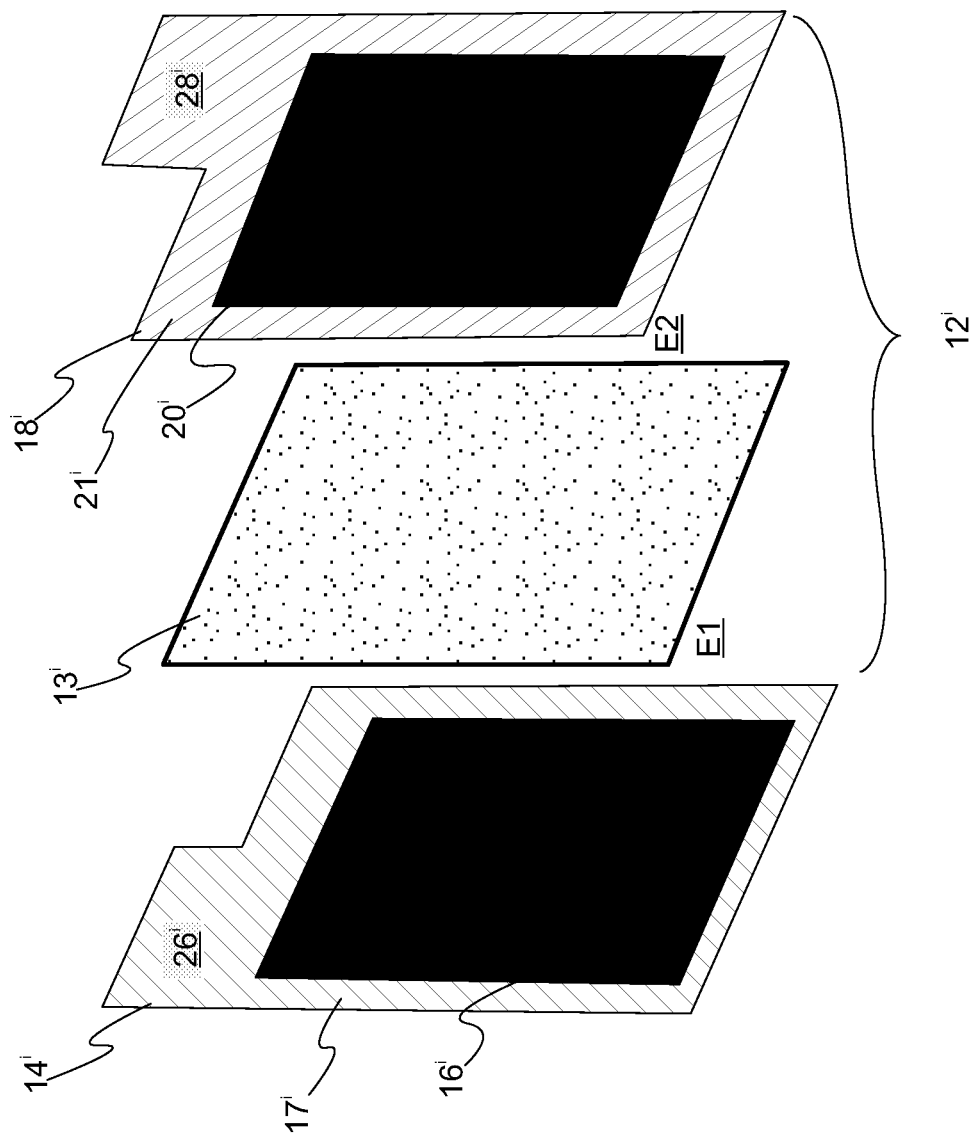
FIG. 1 is a schematic perspective view of a single battery cell.

With reference to FIG. 1, a schematic showing a battery cell used in a battery module with improved temperature characteristics is provided. Although many different types of battery cells may be used in the practice of the present embodiment, lithium ion battery cells are found to be particularly useful. Each battery cell $12^i$ includes an anode $14^i$ having an anode active layer $16^i$ disposed on an anode support $17^i$ and a cathode $18^i$ having a cathode active layer $20^i$ disposed on a cathode support $21^i$. Superscript i is an integer label for the components. Typically, anode supports $17^i$ and cathode supports $21^i$ are metal plates (e.g., aluminum, copper, etc.). Separator $13^i$ is interposed between the anode active layer $16^i$ and the cathode active layer $20^i$. Electrolyte composition E1 is disposed between anode $14^i$ and separator $13^i$ while electrolyte composition E2 is disposed between cathode $18^i$ and separator $13^i$. Characteristically, the battery cells are arranged in pairs that are wired in a parallel fashion. As set forth below, cooling fins and structural layers are interposed between the battery cells in subsets of the pairs of parallel battery cells. Typically, battery cells $12^i$ are wired together via anode tabs $26^i$ and cathode tabs $28^i$ as set forth below in more detail.

Figure 2:
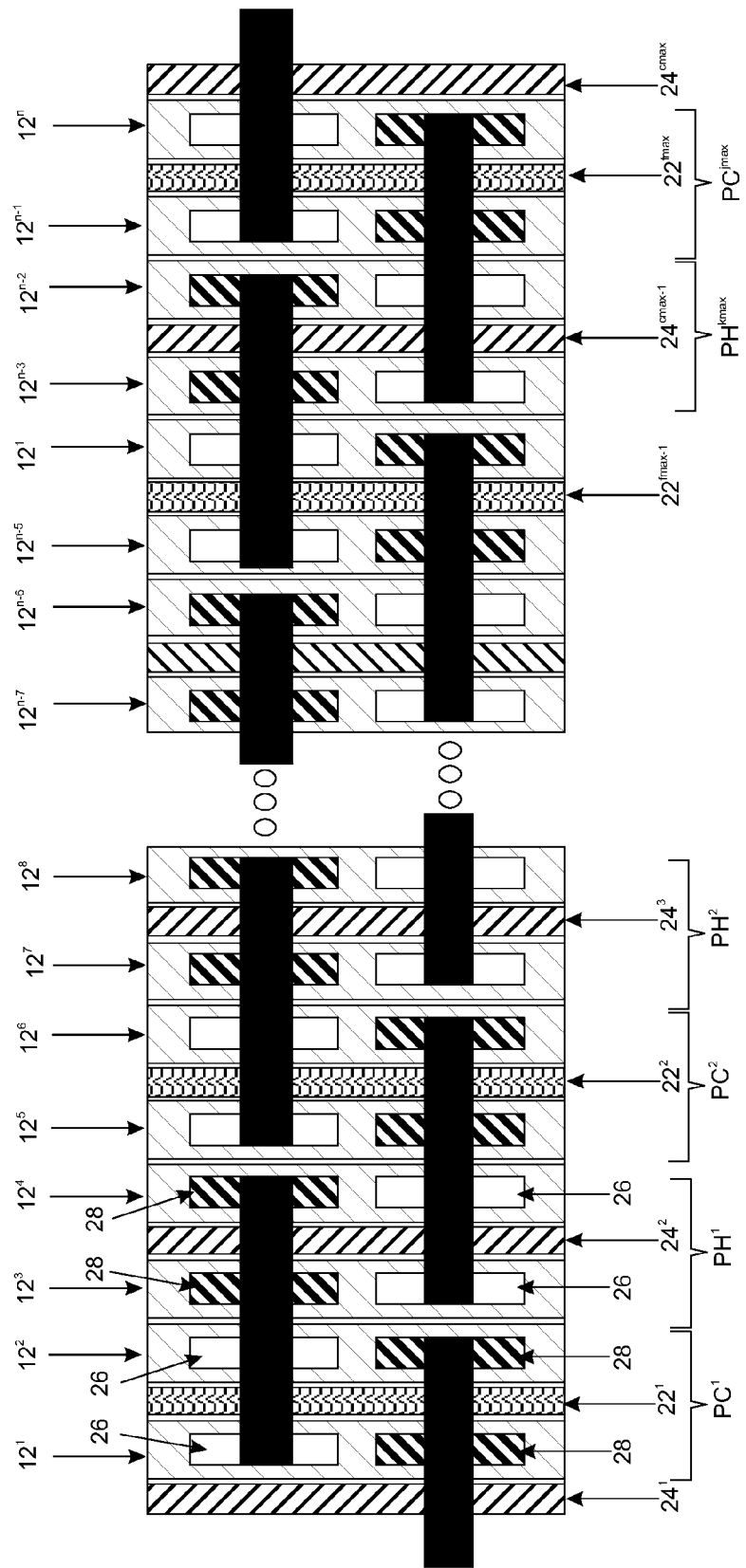
FIG. 2 is schematic top view of a battery module of the present invention showing the wiring of the battery cell pairs with cooling fins and insulating layer contained therein.
Figure 3:
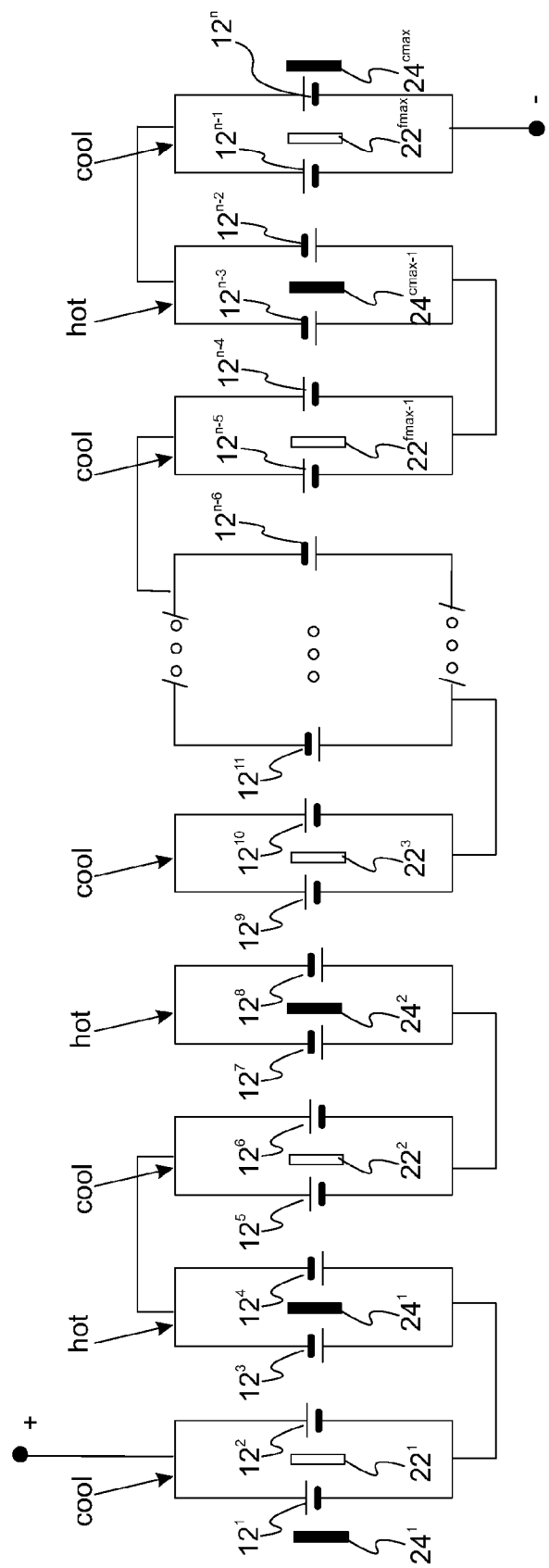
FIG. 3 is a schematic wiring diagram of a plurality of battery cell pairs of the present invention with cooling fins and thermally insulating layers.

With reference to FIGS. 2 and 3, schematics showing the configuration and wiring of the plurality of battery cells in a battery module with improved temperature control is provided. FIG. 2 is a schematic top view of a battery module showing the wiring of the battery cell pairs with cooling fins and insulating layer contained therein. FIG. 3 is a schematic wiring diagram of a plurality of battery cell pairs with cooling fins and thermally insulating layers. As set forth above, battery module 10 includes individual battery cells $12^i$ where i is a label for the components. For the battery cells the label i runs from 1 to n where n represents the total number of battery cells. In a refinement, n is an integer from 6 to 30 to battery cells in battery module 10. The battery cells are arranged in pairs that are wired in a parallel fashion. Cooling fin $22^i$ is interposed between the battery cells in a first subset of the pairs of parallel battery cells $PC^j$. For the cooling fins $22^i$ the label i runs from 1 to fmax. Compression foam $24^i$ (a structural layer) is interposed between a second subset of the pairs of parallel battery cells $PH^k$. For the compression $24^i$ the label i runs from 1 to cmax. The parallel pairs of battery cells are typically arranged in series. In a refinement, battery module 10 has from 6 to 30 battery cells. If expressed in terms of battery cell pairs, battery module 10 has from 3 to 15 battery cell pairs. The variation depicted in FIGS. 2 and 3 is arranged such that the battery cell pairs are stacked in an alternating manner with a battery cell pair $PH^k$ from the second subset interposed between two battery cell pairs $PC^j$, $PC^{j+1}$ from the first subset. In this variation, battery cell pair $PC^j$ includes battery cells $12^{4j-3}$ and $12^{4j-2}$ where j is the label for battery cell pair $PC^j$ running from 1 to jmax (the number of battery pairs in the first subset). Battery cell pair $PH^k$ includes battery cells $12^{4k-1}$ and $12^{4k}$ where k is the label for battery cell pair $PH^k$ running from 1 to kmax (the number of battery pairs in the first battery pairs in the second subset). In a refinement, jmax is greater than kmax and in particular, jmax minus one equals kmax. The arrangement of the present embodiment provides better temperature uniformity between each battery cell of the battery cell pairs. The wiring is accomplished via anode tabs $26^i$ and cathode tabs $28^i$ via cables depicted as black rectangles in FIG. 2. For example, the temperature differences between battery cells $12^1$ and $12^2$ is advantageously less than about 5° C. and the current through battery cell $12^1$ is with 10 percent of the current through cell $12^2$.

Figure 4:
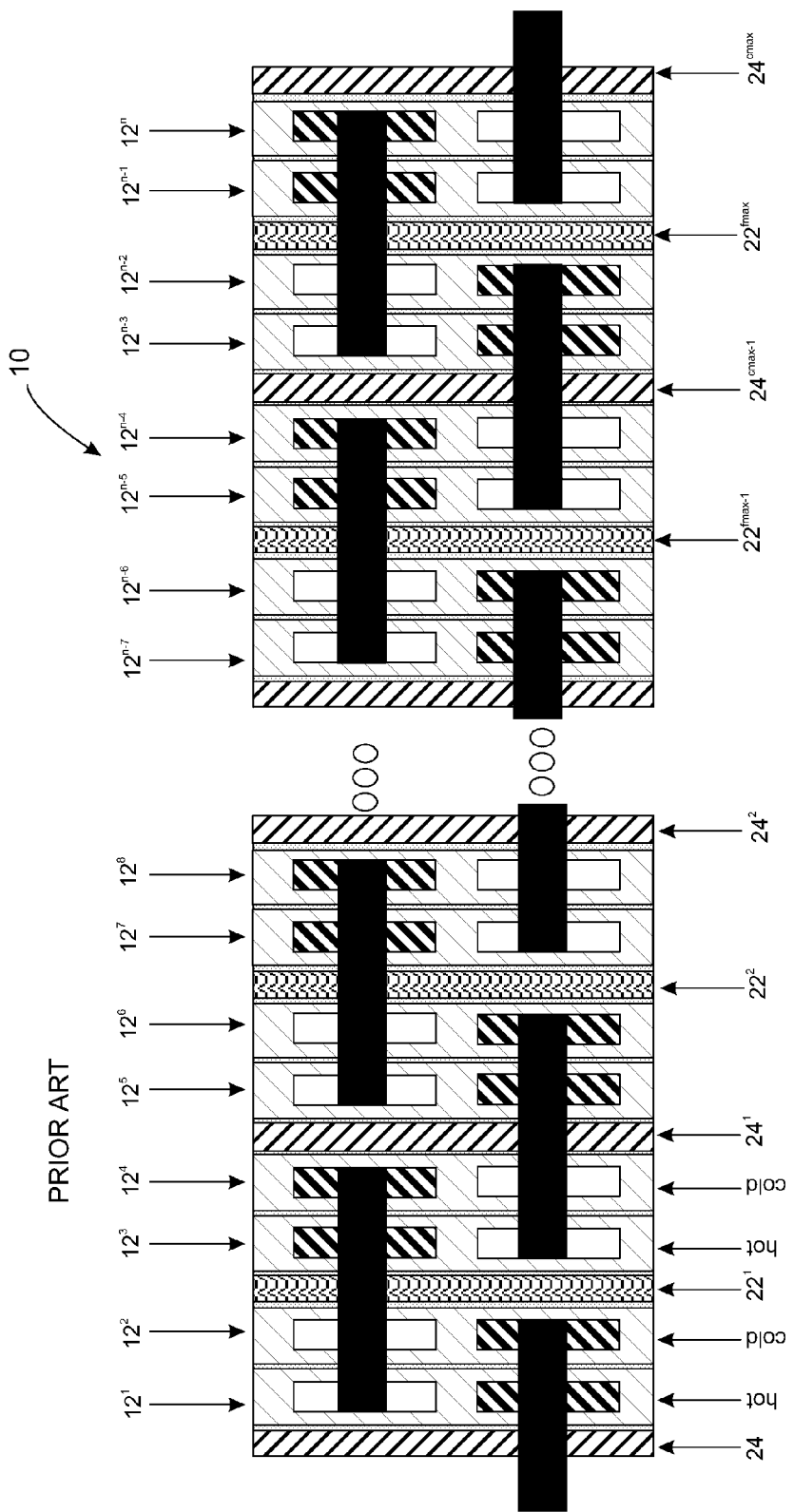
FIG. 4 is a schematic top view of a prior art battery module showing the wiring of the battery cell pairs.

With reference to FIG. 4, a schematic illustrating a prior art battery module is provided. The embodiments set forth above exhibit particularly superior temperature properties than the prior art battery module depicted in FIG. 4. In the prior art configuration, cooling fin 22 is interposed between the first pair of battery cells $12^1$ and $12^2$ and second pair of battery cells $12^3$ and $12^4$ while compression foam 24 is interposed between the second pair of cells $12^3$ and $12^4$ and the third pair of cells $12^5$ and $12^6$. This pattern is repeated for each pair of battery cells as depicted in FIG. 4.

Figure 5:
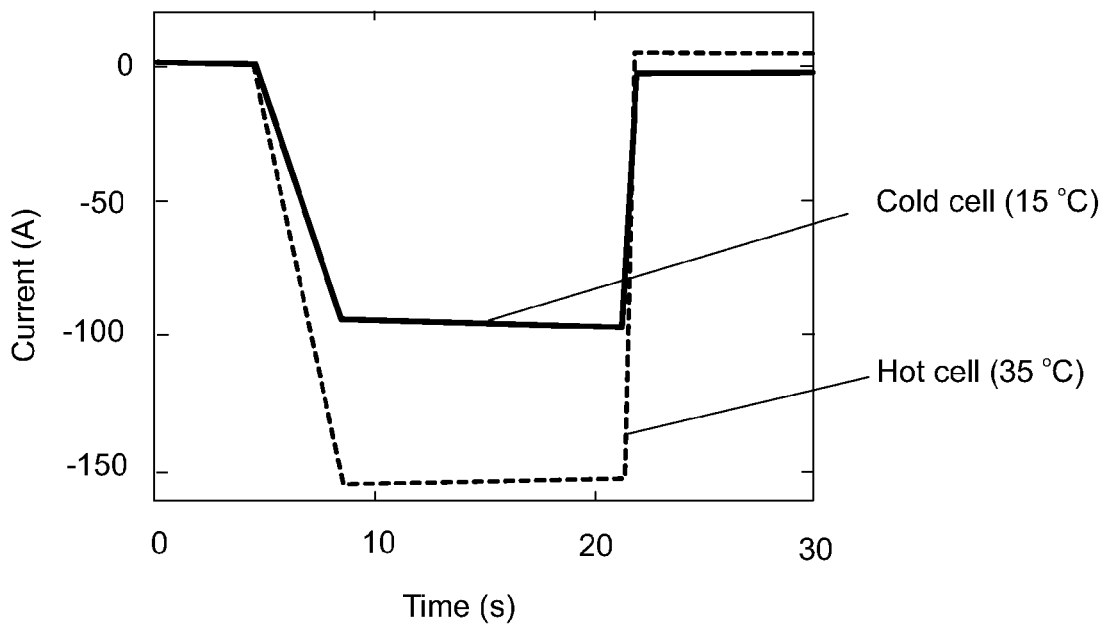
FIG. 5 provides plots of the current for each cell in parallel wired cell pairs for a prior art battery module design.
Figure 6:
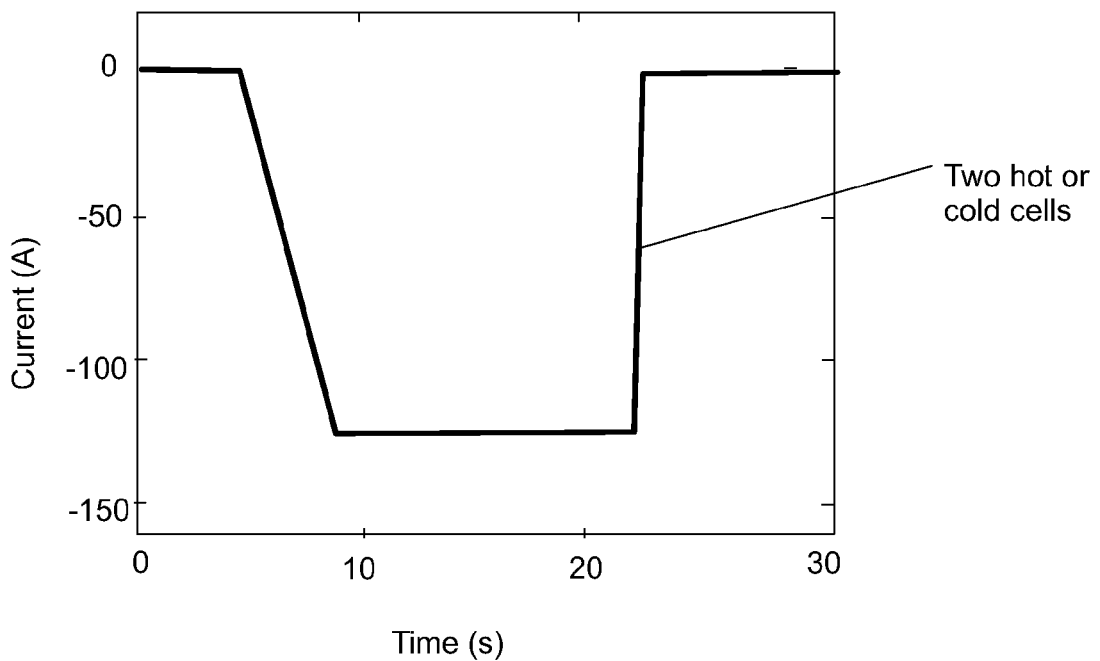
FIG. 6 provides plots of the current for each cell in parallel wired cell pairs with minimal temperature difference between each cell.

With reference to FIGS. 5 and 6, temperature performance for prior art battery modules and embodiments set forth above is provided. FIG. 5 provides the performance of parallel cell pairs in the prior art battery module. It is clearly observed that the battery cells in the parallel cell pairs operate at a temperature difference of about 20° C. and exhibit a difference in current between the hot and cold battery cells. In contrast, as shown in FIG. 6, the battery cells in the parallel cell pairs of the present invention operate with a minimal temperature difference (i.e., about 0° C.) and exhibit virtually no difference in current. As can be seen in FIGS. 5 and 6, the embodiments set forth above minimize temperature differences between parallel connected cells thereby reducing inhomogeneous current distribution between parallel cells. The reduction of such temperature differences results in increased battery lifetime.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A battery module comprising a plurality of stacked battery cells, each battery cell including an anode having an anode active area, a cathode having a cathode active area, and an ion-conducting separator interposed between the anode active area and the cathode active area, a first subset of the battery cells are arranged in parallel wired battery cell pairs, each parallel wired battery cell pair of the first subset including two adjacent battery cells with a cooling fin interposed between the two adjacent battery cells and a second subset of the battery cells are arranged in parallel wired battery cell pairs, each parallel battery cell pair of the second subset including two adjacent battery cells that are different than the battery cells in the first subset, and a thermally insulating layer interposed between the two adjacent battery cells of the second subset.

2. The battery module of claim 1 wherein a temperature difference between each pair of adjacent battery cells of the first subset is less than about 5° C.

3. The battery module of claim 1 wherein for each battery cell pair of the first subset, each of the adjacent battery cells has a current within 10% of the other.

4. The battery module of claim 1 wherein a temperature difference between the two adjacent battery cells of the second subset is less than about 5° C.

5. The battery module of claim 1 wherein each cell pair of the first subset is interposed between cell pairs of the second subset.

6. The battery module of claim 1 wherein each thermally insulated layer comprises a foamed resin.

7. The battery module of claim 1 wherein the plurality of stacked battery cells includes between 6 and 30 battery cells.

8. The battery module of claim 1 wherein the cooling fin of each parallel wired battery cell pair comprises a metal.

9. The battery module of claim 1 wherein the plurality of stacked battery cells includes a first parallel wired cell pair having a first pair of adjacent battery cells with a first cooling fin interposed between the first pair of adjacent battery cells, and a last pair of adjacent battery cells with a last cooling fin interposed between the last pair of adjacent battery cells.

10. A battery module comprising a plurality of batter cells having a first subset of battery cell pairs and a second subset of battery cell pairs, each battery cell pair of the first subset including two adjacent battery cells with a cooling fin interposed between the adjacent battery cells and each battery cell pair of the second subset including two adjacent battery cells that are different than the adjacent battery cells of the first subset with a structural layer interposed between the adjacent battery cells of the second subset, wherein battery cell pairs are stacked in an alternating configuration with each battery cell pair of the second subset being positioned between battery cell pairs of the first subset.

11. The battery module of claim 10 wherein a temperature difference between each pair of adjacent battery cells of the first subset is less than about 5° C.

12. The battery module of claim 10 wherein for each battery cell pair of the first subset each of the adjacent battery cells has a current within 10% of each other.

13. The battery module of claim 10 wherein a temperature difference between the two adjacent battery cells of the second subset is less than about 5° C.

14. The battery module of claim 10 wherein each structural layer comprises a foamed resin.

15. The battery module of claim 10 wherein the plurality of battery cells includes between 6 and 30 battery cells.

16. The battery module of claim 10 wherein each cooling fin comprises a metal.

17. The battery module of claim 10 wherein the plurality of battery cells includes a first parallel wired cell pair having a first pair of adjacent battery cells with a first cooling fin interposed between the first pair of adjacent battery cells, and a last pair of adjacent battery cells with a last cooling fin interposed between the last pair of adjacent battery cells.

\* \* \* \* \*